Feb. 20, 1940.　　　O. H. FOWLER　　　2,190,833
BRAKE TESTER
Filed July 24, 1936　　　4 Sheets-Sheet 1
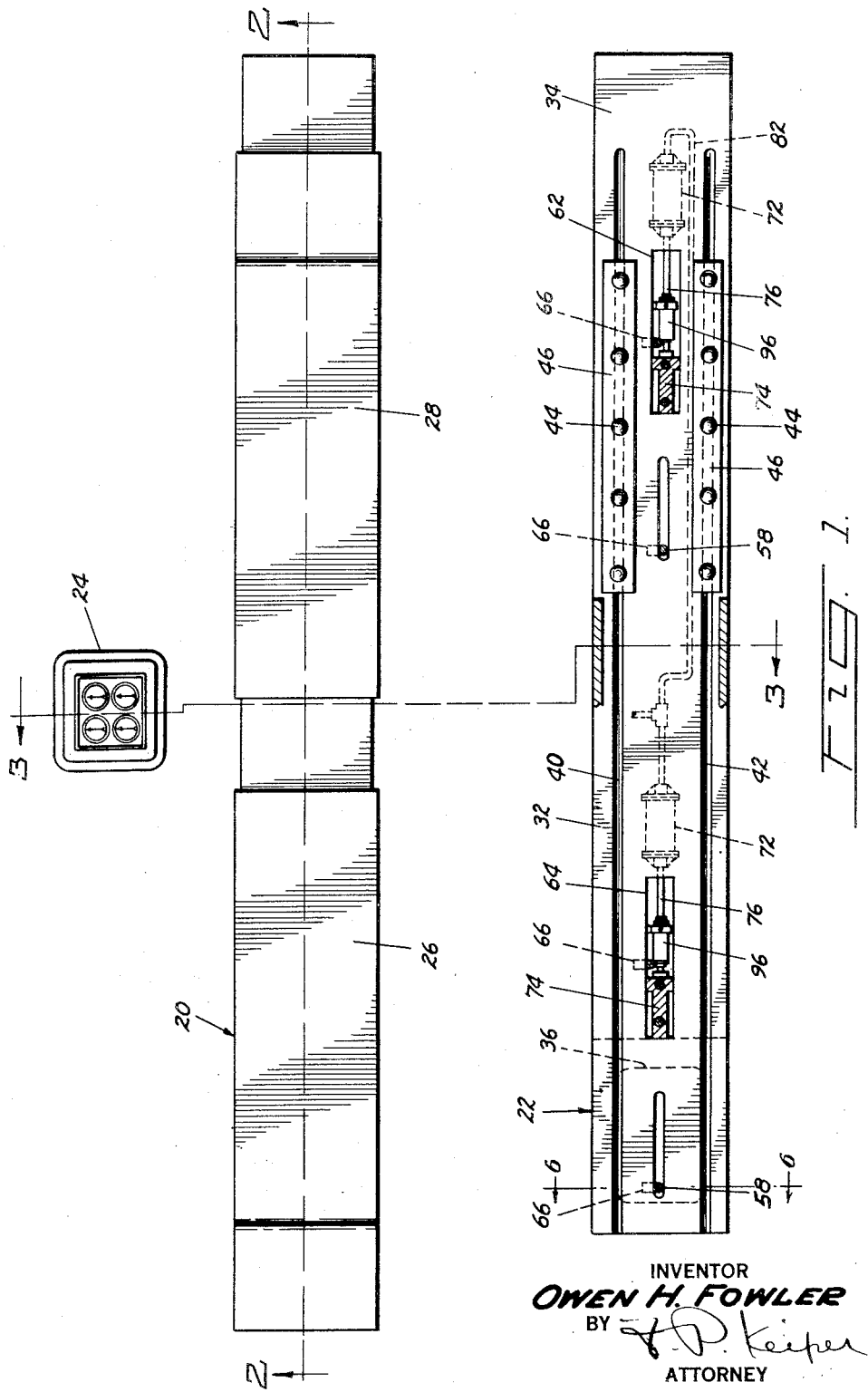
INVENTOR
OWEN H. FOWLER
BY
ATTORNEY

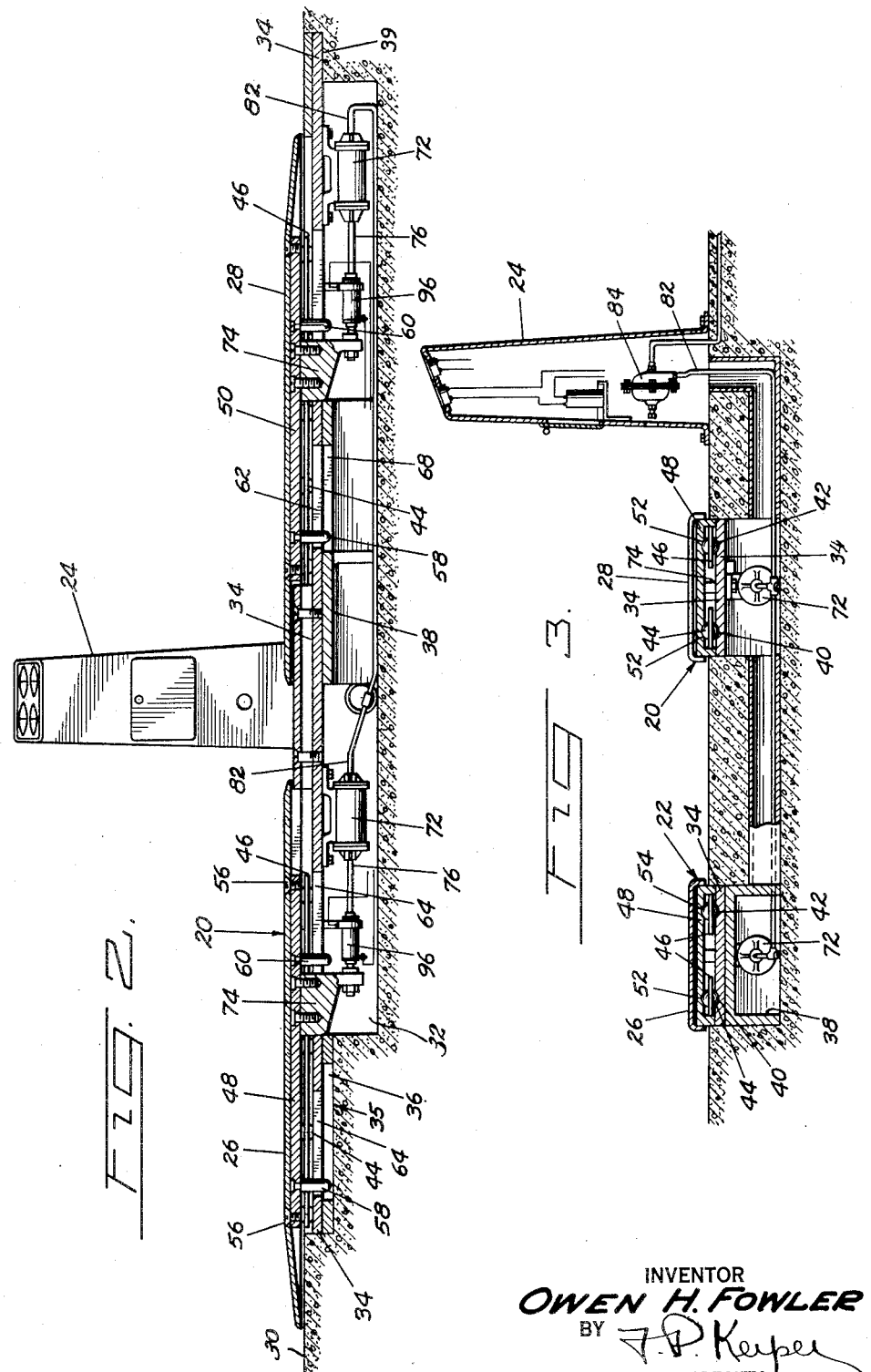

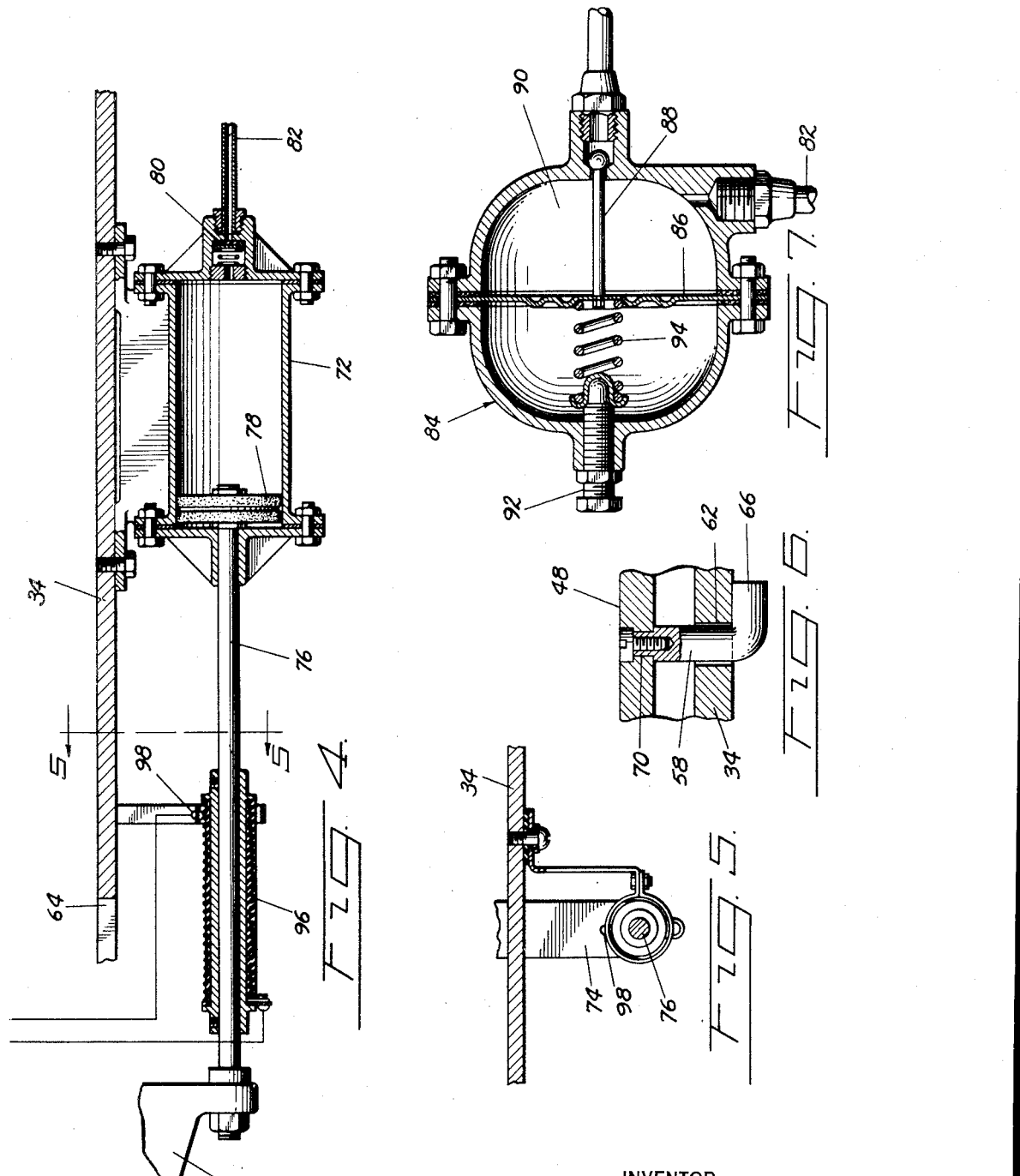

Patented Feb. 20, 1940

2,190,833

UNITED STATES PATENT OFFICE 2,190,833

BRAKE TESTER

Owen H. Fowler, Detroit, Mich., assignor to Bendix Products Corporation, South Bend, Ind., a corporation of Indiana Application July 24, 1936, Serial No. 92,425

5 Claims. (Cl. 73—51)

The present invention relates to brake testers for testing the brakes of automotive vehicles, and more particularly, to a brake tester of the impact type.

In brake testers of the impact type a platform is provided for each of the vehicle wheels or as many of the wheels as are to be tested, the platforms being mounted for movement resulting from the inertia of the vehicle transmitted to the platform through the braked wheels when the vehicle is driven thereon with brakes applied. The extent of movement of the platforms against some sort of resistance such as springs, or the force tending to move the platforms is measured while the vehicle traverses the same with its brakes applied, and thus an indication of brake efficiency is obtained.

In brake testers of the above type, it is necessary that the individual platforms give like readings resulting from like forces applied thereto from braked wheels, so that the indications obtained from the individual wheels may be employed to indicate the extent of equalization between brakes or for comparing the brakes with set standards. In this respect considerable difficulty may be experienced in selecting similar coil springs for resisting platform movement, and selecting coil springs which may remain the same throughout their life and especially after being subjected to numerous impact brake testings, it being understood that the stresses imposed on the springs under locked brake wheel conditions may be excessive.

Accordingly it is an object of the present invention to provide a new and novel means for resisting the movement of the wheel platforms in an impact type brake tester.

A further object of the invention is to provide an air spring for use with an impact tester of the type described.

Another object of the invention is to provide air springs for use with the platforms of an impact tester in combination with means for equalizing the starting pressure in each air spring so that uniformity of operation is obtained between the springs.

Yet another object of the invention is to provide in an impact tester, improved indicating means which will directly indicate the extent of movement of the platform during tests.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Fig. 1 is a top plan view of the tester as adapted for testing four wheels with the platforms of one runway removed;

Fig. 2 is a longitudinal section taken through one platform of one of the runways on the line 2—2;

Fig. 3 is a transverse section taken through the tester as indicated in Fig. 1 by the line 3—3 on which the section is taken;

Fig. 4 is an enlarged longitudinal section through a cushion cylinder and associated indicating means only, also taken on the line 2—2 of Fig. 1;

Fig. 5 is an end view of a contact bracket and resistor looking from the line 5—5 of Fig. 4;

Fig. 6 is a section taken on the line 6—6 of Fig. 1 showing a hold-down bracket;

Fig. 7 is a section through a diaphragm pressure limiting valve for maintaining a uniform minimum pressure in the testing cylinders when idle;

Figure 8:
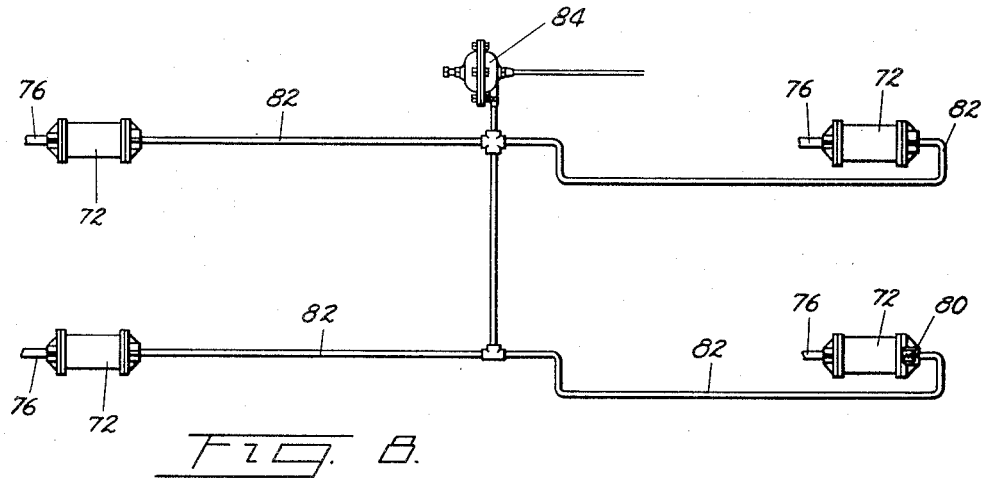
Fig. 8 is illustrative of the air system showing connections between cylinders and pressure valve.
Figure 9:
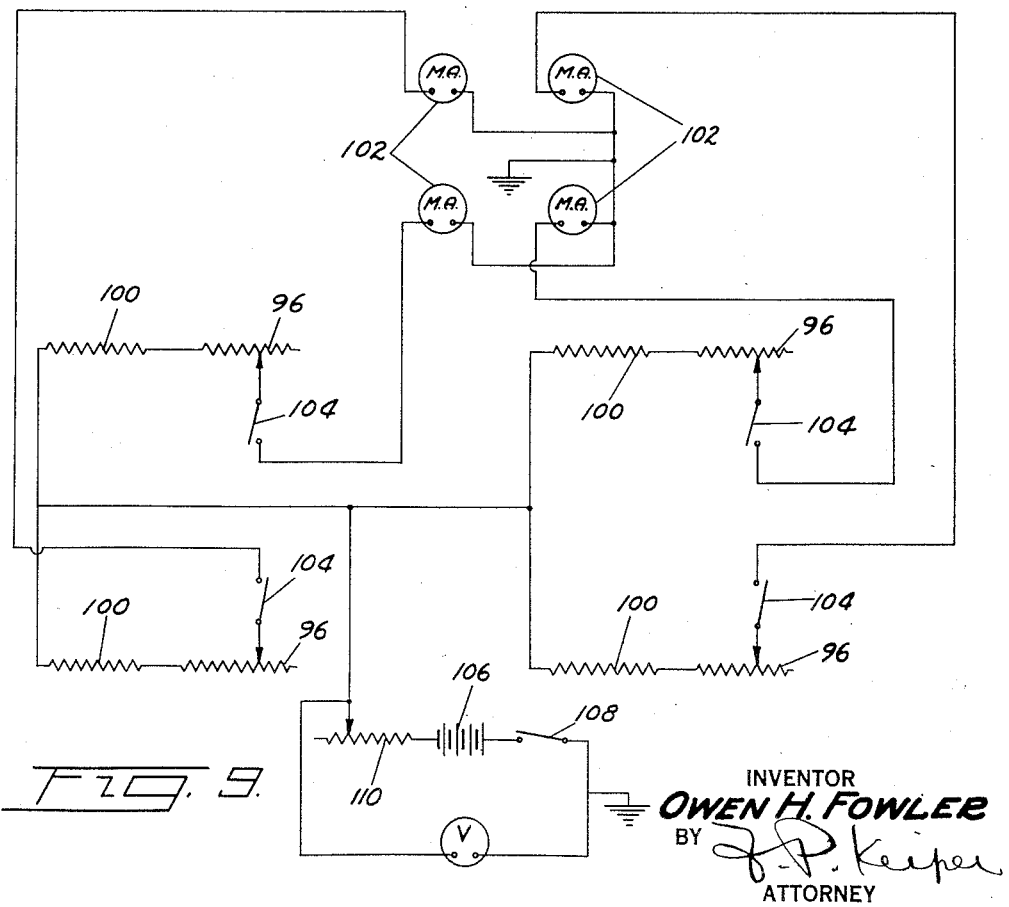
Fig. 9 is illustrative of the electrical system showing the indicators.

Referring more particularly to Fig. 1, there is shown a pair of runways 20 and 22 and an indicating panel 24 conveniently arranged for observation by an operator or from the driver's side of the vehicle, as may be desired. Each of the runways are provided with front wheel and rear wheel engaging platforms or treads 26 and 28, the treads being shown in the left hand runway but removed in the other.

As shown in Fig. 2, the runways may be placed in a floor 30 having a stepped recess 32 specially arranged for such purpose. Each runway comprises a main flat member 34 which is supported at the left end on a step 35 but spaced therefrom slightly by a flat hollow rectangular support frame 36. The central portion of the main member 34 is supported on an inverted channel member 38, and the extreme right hand end rests upon a step 39.

The main longitudinal members 34 are provided with parallel grooves 40 and 42 on their upper surfaces adjacent each edge adapted to receive a series of rolling balls 44 held in spaced relation by perforated retainers 46, which balls in turn are adapted to support longitudinally movable plates 48 and 50 provided with corresponding ball-receiving grooves 52 and 54 in their under surfaces. A tread plate either 26 or 28 is provided for each of the wheel platforms or treads, the same being secured thereto by any suitable fastening means such as screws 56.

The extent of longitudinal rolling movement of each of the plates is restricted by a pair of depending pins 58 and 60 located centrally at each end of the plates and projecting into slots 62 and 64 provided in the main supporting members, and to prevent the removal of the plates, or any tendency of them to jump, the pins may be provided with a right angle transversely-extending bend 66 below the support plate, so that the plates are in effect hooked in position. The hollow rectangular frame member 36 heretofore described provides clearance for the hook of the pin on the extreme left. The channel support 38 has a corresponding opening 68 which also permits the pin to extend through the main member. The pin hooks may have squared heads at 70 as shown in Fig. 6 to prevent their possible dislocation or rotation to an ineffective position.

To resist the movement of each of the vehicle wheel platforms or carriers when a wheel is rolled thereover with brakes applied, a cylinder 72 for each platform is secured underneath and to the main longitudinal frame member, and a bracket 74 secured by a piston rod 76 to a piston 78 within the cylinder is rigidly secured to each corresponding platform 48, 50. The left hand end of each cylinder is open to atmosphere, while the right hand end is provided with a check valve 80, and a connection 82 to each of the other cylinders and to a pressure regulator 84 which in turn is connected to any suitable source of compressed air, for example such as is found in garages for the purpose of inflating tires. Each of the check valves offer little or no resistance to the inflow of air to the cylinders, but are each adjusted uniformly with respect to one another so as to offer the same resistance if any.

The pressure regulator is provided with a diaphragm 86 to which is connected a valve 88 which may be unseated whenever the pressure in the right hand chamber 90 falls below a given amount so that air may then enter from the source of supply. This pressure is adjustable at will by varying the position of the screw 92 so as to vary the tension on the spring 94 bearing against the diaphragm. Thus regardless of leakage or any other cause, the pressure within the various cylinders is maintained at a fixed minimum value.

In order to obtain an indication as to the amount of piston movement effected in resisting any forces imparted to the wheel platform, the piston rods 76 of each of the cylinders may be provided with a resistor unit 96, all of which are preferably alike, and which cooperate with a stationary sliding contact 98. In circuit with each resistor may be an additional fixed or variable resistor 100 to adjust each individual circuit to equality, and an indicating meter such as a galvanometer 102, so that the current flow at any instant may be measured. Also the galvanometer may be provided with a maximum indicator to indicate the maximum indication after the test is completed. It will appear obvious that as the resistor is moved in response to movement of the platform, an increase in current flows through that particular circuit from the common battery and an indication on the meter will be given proportional to the movement of the platform. Thus comparative and quantitative measurements are obtained of the braking efficiency of the various automotive vehicle wheels, and their brakes, as the vehicle is rolled across the brake testing platforms, with brakes applied. The various switches 104 may be operated to open one or all the circuits, or for example to close the circuits for testing rear wheel brakes only as would be the case when testing hand brakes, which usually affect only the rear wheels. A battery 106 with a master switch 108 may be connected in the circuit to energize the various circuits, a variable resistor 110 being illustrated in the circuit for control purposes.

It may, of course, appear obvious that, if desired, the forward wheel platform cylinders may be varied in diameter so that greater or less braking effect on the forward wheels may result in an equal movement of front and rear cylinders giving a like indication for all wheels when the rear brakes and front brakes are adjusted to give the desired ratio of effectiveness. Likewise the resistors may be varied to give the same effect, or the check valves of one pair of cylinders may be loaded with respect to others to produce a similar effect, all of which will readily appear to any one skilled in the art.

There is thus provided a novel impact brake testing device having a novel structure for resisting the braking effect of the vehicle wheels and measuring the effect thereof, which device is dependable, always equalizing and not subject to misadjustment during the normal life thereof or due to sudden excessive shock forces to which the parts are subjected, each test being conducted after all resulting cylinders are brought to normal position and subjected to equal internal pressures. It will also appear, that since the compression of gas is unlike that of a spring, that is being geometrical rather than arithmetical with regard to the relation between pressure and stroke, each platform is assured cushioning before the limit of its stroke, regardless of the magnitude of the force applied to wheel platforms. Thus the apparatus cannot be subjected to unusual stresses without some cushioning, nor may any of the parts, as might be the case with springs, be carried beyond their elastic limit.

Though but a single embodiment of the invention has been illustrated and described, it is to be understood that the invention is not limited thereto but may be embodied in various other mechanical arrangements and forms. As various changes in construction and arrangement may be made without departing from the spirit of the invention, as will be apparent to those skilled in the art, reference will be had to the appended claims for a definition of the limits of the invention.

What is claimed is:

1. An impact automotive vehicle brake tester comprising a longitudinally movable wheel platform, a fixed cylinder, a piston movable longitudinally therein and secured to the platform, an inlet in the cylinder forward of the piston provided with a check valve to prevent outflow, means connected to the valve for maintaining a positive minimum pressure in the cylinder, and electrically actuated indicating means having a part carried by the piston for indicating actual piston movement.

2. An impact automotive vehicle brake tester comprising a longitudinally movable wheel platform, a compressible chamber means connected between said platform and a relatively fixed support, a check valve in said chamber means preventing outflow of gas, means connected to said valve for maintaining a constant minimum pressure in the chamber, and electrically actuated means for indicating the compression of said chamber means.

3. An impact automotive vehicle brake tester comprising a longitudinally movable wheel platform, a compressible chamber means connected between said platform and a relatively fixed support, means including a check valve in said chamber means for preventing egress of fluid therefrom, a pressure regulator connected to said check valve to maintain a fixed minimum pressure within said chamber means, and an electrically actuated indicator for indicating the compression of said chamber means.

4. An impact automotive vehicle brake tester comprising a plurality of longitudinally movable wheel supports, a fluid pressure compression chamber associated with each platform to resist movement thereof, a check valve in each of said chambers for preventing egress of gas therefrom, means for establishing a fixed minimum pressure upon each of said check valves to establish a fixed minimum pressure within each of said chambers and electrically actuated indicating means for indicating the compression of each of said chambers.

5. An impact brake tester comprising a plurality of movable platforms for engaging the wheels of a vehicle, a plurality of cylinders having pistons therein and means connecting each platform to a cylinder or piston for causing relative movement therebetween, an inlet connection to each cylinder having a check valve associated therewith, a pressure regulator connected to each of said inlets, said valve having means for adjustably regulating the pressure in said cylinders and inlet connections and electrical means actuated by movement of the pistons for indicating actual piston movement.

OWEN H. FOWLER.